United States Patent
Hwang et al.

(10) Patent No.: US 10,855,158 B2
(45) Date of Patent: Dec. 1, 2020

(54) MAGNETIC POWER GENERATION

(71) Applicant: Watasensor, Inc., San Jose, CA (US)

(72) Inventors: George Fuh Hwang, San Jose, CA (US); Kajiro Watanabe, Tokyo (JP); Danh Le Ngoc, Saratoga, CA (US)

(73) Assignee: WATASENSOR, INC., Saratoga, CA (US)

( * ) Notice: Subject to any disclaimer, the term of this patent is extended or adjusted under 35 U.S.C. 154(b) by 0 days.

(21) Appl. No.: 16/387,311

(22) Filed: Apr. 17, 2019

(65) Prior Publication Data
US 2019/0326804 A1    Oct. 24, 2019

Related U.S. Application Data (60) Provisional application No. 62/660,193, filed on Apr. 19, 2018.

(51) Int. Cl.
*H02K 35/02* (2006.01)
*H02K 5/04* (2006.01)

(52) U.S. Cl.
CPC .............. *H02K 35/02* (2013.01); *H02K 5/04* (2013.01)

(58) Field of Classification Search
CPC .................................. H02K 35/02; H02K 5/04
USPC ................... 290/1 R; 310/23, 339; 307/10.1; 335/229
See application file for complete search history.

(56) References Cited

U.S. PATENT DOCUMENTS

| | | | | |
|---|---|---|---|---|
| 2,380,242 A * | 7/1945 | Jewell | ........... | G01D 5/2033 340/870.33 |
| 2,919,324 A * | 12/1959 | Schuessler | ......... | H01H 51/2209 335/137 |
| 3,254,310 A * | 5/1966 | O'Meara | ........... | H03B 5/30 330/63 |
| 4,027,182 A * | 5/1977 | Sprinkle | ........... | G01P 3/488 310/111 |
| 4,035,789 A * | 7/1977 | Akita | ........... | G01F 23/70 340/618 |
| 4,686,841 A * | 8/1987 | Prunbauer | ........... | E05B 47/0042 70/276 |
| 4,690,371 A * | 9/1987 | Bosley | ........... | F16K 31/082 251/129.01 |
| 5,177,370 A * | 1/1993 | Meister | ........... | B60R 21/0132 180/282 |
| 5,430,334 A * | 7/1995 | Meister | ........... | B60R 21/0132 307/10.1 |
| 5,434,549 A * | 7/1995 | Hirabayashi | ........... | H02K 33/00 335/229 |
| 5,521,446 A * | 5/1996 | Chalupa | ........... | H01F 7/1615 310/12.01 |
| 5,698,773 A * | 12/1997 | Blom | ........... | G01N 11/162 73/54.18 |
| 5,719,451 A * | 2/1998 | Cook | ........... | H02K 3/26 310/12.24 |

(Continued)

*Primary Examiner* — Pedro J Cuevas
(74) *Attorney, Agent, or Firm* — Fountainhead Law Group P.C.

(57) ABSTRACT

Embodiments of the present disclosure include an apparatus comprising an electronic device, a first magnet, and an inductive coil surrounding a magnetically susceptible core, wherein movement of the first magnet relative to the magnetically susceptible core changes a magnetic flux in the magnetically susceptible core to produce a current in the inductive coil, and in accordance therewith, provide power to the electronic device.

14 Claims, 10 Drawing Sheets

(56) References Cited

U.S. PATENT DOCUMENTS

| | | | | |
|---|---|---|---|---|
| 6,040,752 | A * | 3/2000 | Fisher | H01F 7/1615 335/229 |
| 6,229,300 | B1 * | 5/2001 | Dlugos | G01C 9/06 307/419 |
| 6,474,120 | B1 * | 11/2002 | Wadsworth | E05B 63/185 292/251.5 |
| 6,501,357 | B2 * | 12/2002 | Petro | H01F 7/13 310/17 |
| 6,552,450 | B2 * | 4/2003 | Harty | H02K 33/14 310/12.21 |
| 6,768,230 | B2 * | 7/2004 | Cheung | F16C 33/1035 290/1 R |
| 6,809,427 | B2 * | 10/2004 | Cheung | H02K 35/02 290/1 R |
| 6,812,583 | B2 * | 11/2004 | Cheung | H02K 35/02 290/1 A |
| 6,812,598 | B2 * | 11/2004 | Cheung | H02K 35/02 290/1 R |
| 6,861,772 | B2 * | 3/2005 | Cheung | H02K 35/02 290/1 R |
| 7,227,439 | B2 * | 6/2007 | Kelly | H01F 7/066 310/12.24 |
| 7,267,378 | B2 * | 9/2007 | Drumm | E05C 19/163 292/251.5 |
| 7,288,860 | B2 * | 10/2007 | Cheung | H02K 35/02 290/1 R |
| 7,579,757 | B2 * | 8/2009 | Kulah | F03G 7/08 310/339 |
| 7,683,507 | B2 * | 3/2010 | Kelly | H02K 7/1876 310/12.12 |
| 7,710,226 | B2 * | 5/2010 | Nelson | H01F 7/1646 335/229 |
| RE41,626 | E * | 9/2010 | Cheung | H02K 35/02 290/1 R |
| 7,960,851 | B2 * | 6/2011 | Van Huffel | F03B 17/06 290/54 |
| 8,084,898 | B2 * | 12/2011 | Kawano | H02K 49/10 310/12.14 |
| 8,115,350 | B2 * | 2/2012 | Yoshida | H02K 35/02 29/596 |
| 8,188,821 | B2 * | 5/2012 | Nelson | H01F 7/1646 335/229 |
| 8,344,560 | B2 * | 1/2013 | Gosvener | H02K 7/075 310/14 |
| 8,540,292 | B2 * | 9/2013 | Ferguson | E05C 17/56 24/303 |
| 8,559,277 | B2 * | 10/2013 | Karapatis | G04B 21/06 368/272 |
| 8,618,702 | B2 * | 12/2013 | Iijima | H02K 35/02 310/12.24 |
| 8,633,605 | B2 * | 1/2014 | Esteve Tinto | H02K 35/02 290/1 A |
| 8,749,331 | B2 * | 6/2014 | Kashimura | H01H 33/182 335/126 |
| 8,796,907 | B2 * | 8/2014 | Galchev | H02N 2/186 310/339 |
| 8,823,472 | B2 * | 9/2014 | Takaya | H01H 9/443 335/132 |
| 9,046,187 | B2 * | 6/2015 | Wygnanski | F16K 31/0682 |
| 9,214,267 | B2 * | 12/2015 | Bory | H01F 7/122 |
| 9,341,062 | B2 * | 5/2016 | Kolbenschlag | F15B 21/082 |
| 9,390,875 | B2 * | 7/2016 | Kohlhafer | H01H 50/20 |
| 9,447,617 | B2 * | 9/2016 | Smith | E05C 17/56 |
| 9,447,619 | B2 * | 9/2016 | Trinh | E05C 19/16 |
| 9,476,400 | B2 * | 10/2016 | Phillips | F03B 13/16 |
| 9,641,045 | B2 * | 5/2017 | Lewis, Sr. | F03B 11/00 |
| 9,644,601 | B2 * | 5/2017 | Phillips | F03B 13/16 |
| 9,917,496 | B2 * | 3/2018 | Nelson | H02K 33/10 |
| 9,947,448 | B2 * | 4/2018 | Kohlhafer | H01H 50/20 |
| 10,033,249 | B2 * | 7/2018 | Liao | H02K 21/14 |
| 10,128,778 | B2 * | 11/2018 | Yoo | H02N 2/186 |
| 10,141,144 | B2 * | 11/2018 | Zhuang | H01H 50/021 |
| 10,149,936 | B2 * | 12/2018 | Forsell | A61B 5/686 |
| 2001/0008501 | A1 * | 7/2001 | Sekine | G11B 11/1056 369/13.01 |
| 2001/0026204 | A1 * | 10/2001 | Petro | H02K 33/16 335/229 |
| 2003/0155771 | A1 * | 8/2003 | Cheung | H02K 35/02 290/1 R |
| 2003/0155827 | A1 * | 8/2003 | Cheung | H02K 35/02 310/90.5 |
| 2003/0155828 | A1 * | 8/2003 | Cheung | H02K 35/02 310/90.5 |
| 2003/0218541 | A1 * | 11/2003 | Sakai | G08B 13/08 340/545.1 |
| 2004/0155467 | A1 * | 8/2004 | Cheung | H02K 35/02 290/1 R |
| 2004/0164626 | A1 * | 8/2004 | Cheung | H02K 35/02 310/30 |
| 2004/0251750 | A1 * | 12/2004 | Cheung | H02K 35/02 310/23 |
| 2005/0052265 | A1 * | 3/2005 | Vladimirescu | H01H 51/2209 335/229 |
| 2006/0049645 | A1 * | 3/2006 | Drumm | E05C 19/163 292/251.5 |
| 2008/0084121 | A1 * | 4/2008 | Kelly | H02K 35/00 310/12.12 |
| 2008/0164964 | A1 * | 7/2008 | Nelson | H01F 7/1646 335/229 |
| 2009/0078484 | A1 * | 3/2009 | Kocijan | B60L 13/04 180/167 |
| 2009/0281387 | A1 * | 11/2009 | Takizawa | A61B 1/00156 600/117 |
| 2010/0001592 | A1 * | 1/2010 | Kawano | A61B 1/00158 310/12.14 |
| 2010/0084928 | A1 * | 4/2010 | Yoshida | H02K 35/02 310/15 |
| 2010/0180570 | A1 * | 7/2010 | Tavarez | H02K 53/00 60/204 |
| 2011/0084502 | A1 * | 4/2011 | Ghassemi | F03G 7/08 290/1 R |
| 2011/0140577 | A1 * | 6/2011 | Galchev | H02N 2/186 310/339 |
| 2011/0210809 | A1 * | 9/2011 | Nelson | H01F 7/1646 335/230 |
| 2012/0007448 | A1 * | 1/2012 | Gosvener | H02K 7/075 310/23 |
| 2012/0104765 | A1 * | 5/2012 | Esteve Tinto | H02K 35/02 290/1 A |
| 2012/0139262 | A1 * | 6/2012 | Begley | H02K 35/02 290/1 R |
| 2012/0147715 | A1 * | 6/2012 | Karapatis | G04B 21/08 368/267 |
| 2012/0153633 | A1 * | 6/2012 | Kolbenschlag | H02K 35/02 290/1 A |
| 2012/0194008 | A1 * | 8/2012 | Iijima | H02K 35/02 310/30 |
| 2013/0087726 | A1 * | 4/2013 | Wygnanski | F16K 31/06 251/129.01 |
| 2013/0228552 | A1 * | 9/2013 | Kashimura | H01H 51/22 218/26 |
| 2013/0257567 | A1 * | 10/2013 | Takaya | H01H 50/163 335/133 |
| 2013/0328431 | A1 * | 12/2013 | Teo | H02K 41/0356 310/154.02 |
| 2014/0002218 | A1 * | 1/2014 | Bory | H01F 7/122 335/229 |
| 2014/0123846 | A1 * | 5/2014 | Kolbenschlag | H02K 35/02 91/361 |
| 2014/0339928 | A1 * | 11/2014 | Phillips | F03B 13/1855 310/30 |
| 2014/0354381 | A1 * | 12/2014 | Kohlhafer | H01F 7/081 335/179 |
| 2015/0374906 | A1 * | 12/2015 | Forsell | A61N 1/3787 600/31 |
| 2016/0072372 | A1 * | 3/2016 | Nelson | H02K 33/10 310/36 |
| 2016/0293310 | A1 * | 10/2016 | Kohlhafer | H02K 33/18 |

(56) References Cited

U.S. PATENT DOCUMENTS

| | | | | |
|---|---|---|---|---|
| 2017/0163179 | A1* | 6/2017 | Yoo | H02N 2/186 |
| 2018/0226215 | A1* | 8/2018 | Zhuang | H01H 49/00 |
| 2019/0111206 | A1* | 4/2019 | Forsell | A61N 1/05 |
| 2019/0353271 | A1* | 11/2019 | Uehara | F16K 37/00 |
| 2019/0386553 | A1* | 12/2019 | Lin | H02K 35/02 |

* cited by examiner

MAGNETIC POWER GENERATION

BACKGROUND

The present disclosure relates to apparatuses, systems, and methods including a power generator for an electronic device.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

One aspect of the disclosure includes an electronic power generator, which in some embodiments may include a magnet-based power generator that supplies voltage for power-less devices (e.g., devices without a battery).

In one embodiment, the present invention includes an apparatus comprising an electronic device that receives power from an arrangement of at least one magnet and an inductive coil coupled to a magnetically susceptible core. The inductive coil may surround the core, for example. Movement of the first magnet relative to the magnetically susceptible core changes a magnetic flux in the magnetically susceptible core to produce a current in the inductive coil, and in accordance therewith, provide power to the electronic device. The power to the device may be used to charge a power source, such as a battery, or provide power to a device with no other power source (e.g., a battery-less electronic device). In one embodiment, the first magnet is in a chamber with the core arranged at one location in the chamber. An external magnet may be used to move the first magnet inside the chamber. As illustrated below, the core may be located at a proximate end of the chamber and the external magnet may move around the distal end, where the external magnet pulls the internal magnet away from the core. In another embodiment, the external magnet may move parallel with the chamber and with the movement of the internal magnet inside the chamber so that the internal magnet is pulled along the chamber between a proximate end where the core is located and a distal end away from the core, for example.

In one embodiment, the first magnet resides in a chamber, and the first magnet collides with one or more of a distal end, proximate end, or sidewall of the chamber to produce vibrations that move the first magnet relative to the magnetically susceptible core. Movement of either the magnet or the core relative to each other, changes the magnetic flux of the core. Changing magnetic fields in the core, in turn, induce a current in the inductive coil, which provides power to the electronic device, for example.

Figure 1:
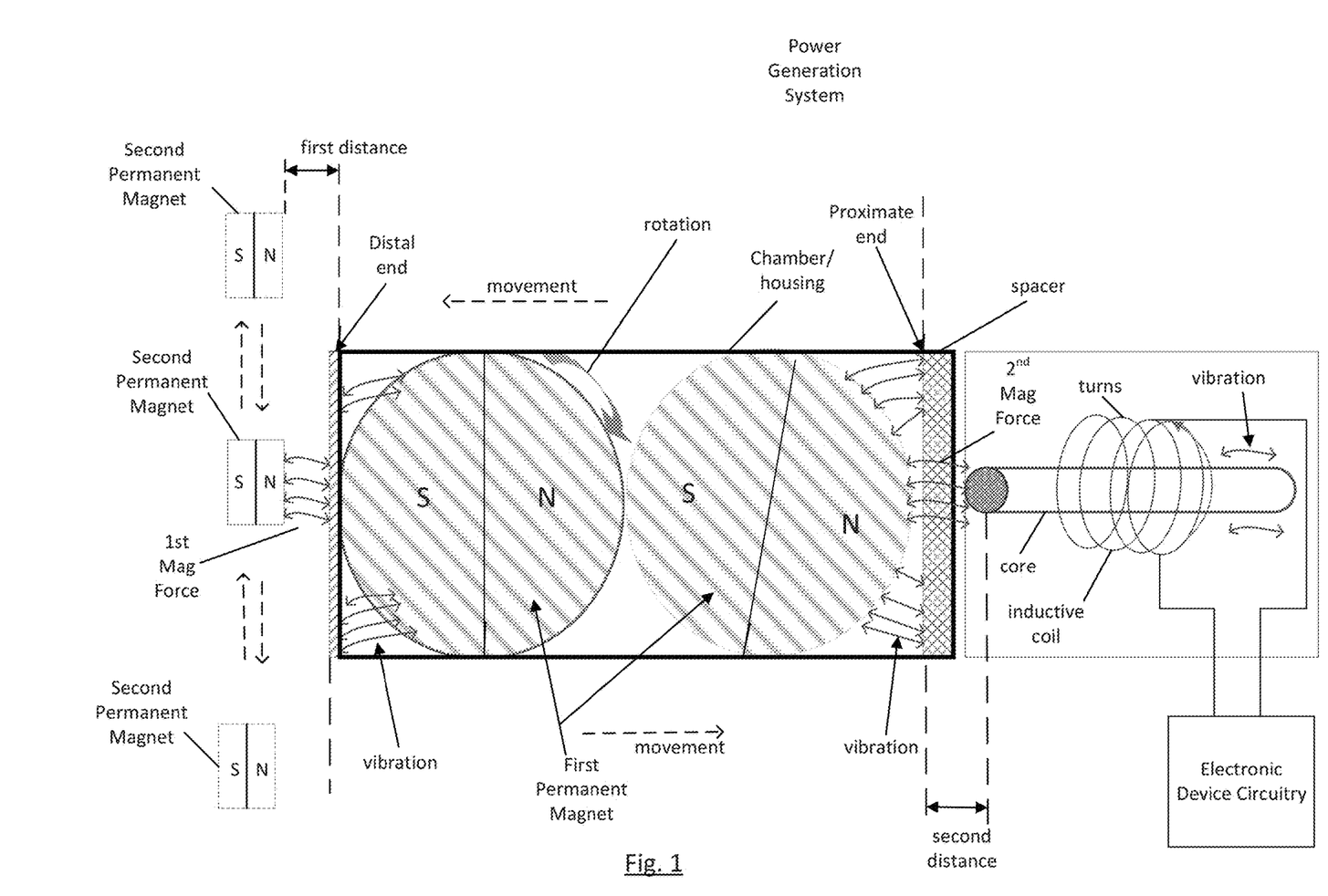
FIG. 1 illustrates an apparatus according to one embodiment of the present disclosure.

FIG. 1 illustrates an example embodiment. In this example, the apparatus comprising an electronic circuit, a chamber, a first permanent magnet configured in the chamber, a second permanent magnet external to the chamber and moveable relative to the first permanent magnet at a distal end of the chamber, a magnetically susceptible element (e.g., a core) external to the chamber and located at the proximate end of the chamber, and an inductive coil magnetically coupled to the magnetically susceptible element. The first and second permanent magnets are configured to generate a first magnetic force that changes in response to the movement of the second permanent magnet relative to the first permanent magnet. In this example, the second permanent magnet moves orthogonally to (e.g., vertically) the first permanent magnet (e.g., which moves laterally). The magnetically susceptible element (e.g., core) and the first permanent magnet are configured to generate a second magnetic force that changes in response to the movement of the first permanent magnet relative to the magnetically susceptible element, for example. The inductive element has an output coupled a power input of the electronic circuit, for example. When the first magnetic force is greater than the second magnetic force, the first permanent magnet is pulled toward the second permanent magnet and away from the magnetically susceptible element. However, when the second magnetic force is greater than the first magnetic force, the first permanent magnet is pulled toward the magnetically susceptible element, for example. Movement of the first permanent magnet causes a change in a magnetic flux of the magnetically susceptible element, and in accordance therewith, produces a voltage at the output of the inductive coil to power the electronic device.

In one embodiment, the second permanent magnet moves relative to the first permanent magnet such that the first and second magnetic forces alternatively control the movement of the first permanent magnet. In this example, when the second magnet is above or below the distal end of the chamber, the first magnetic force reduces in strength and the second magnetic force causes the first magnet to move to the proximate end of the chamber toward the core. When the second magnet is near the distal end of the chamber, the first magnetic force increases in strength sufficient to overcome the second magnetic force and move the first magnet to the distal end of the chamber. Accordingly, when the second permanent magnet is in a first range from the first permanent magnet (e.g., near the distal end of the chamber), the first magnetic force exceeds the second magnetic force and the first permanent magnet is pulled toward the second permanent magnet at the distal end and away from the proximate end. Conversely, when the second permanent magnet in a second range from the first permanent magnet greater than the first range (e.g., above or below the distal end), the second magnetic force exceeds the first magnetic force and the first permanent magnet is pulled toward the magnetically susceptible element at the proximate end and away from the distal end.

Power for the electronic device may be derived from a changing magnetic flux (or magnetic field) in the core, which generates a current in the inductive coil. Changes in the magnetic field are derived from movement of the magnet relative to the core. For example, the first permanent magnet collides when it reaches a distal end or proximate end and creates vibrations upon colliding. The vibrations change the magnetic flux. Similarly, movement of the first permanent magnet when pulled across the chamber to either the magnetically susceptible core or the second permanent magnet changes the magnetic flux. A variety of mechanisms may be used to move the first magnet relative to the core. The mechanism shown in FIG. 1 is merely exemplary.

As mentioned above, the magnetically susceptible element may include a magnetically susceptible core (e.g., a metal core) surrounded by the inductor, where current flows through the inductive coil due to vibrations or other movement of the first permanent magnet. The inductive coil may be wrapped around the core N number of turns (or windings), N being an integer value. The number of turns of the inductive coil determines a current generated in the inductive coil based on a changing magnetic flux in the core, for example.

In this example, the first permanent magnet is a spherical ball and the chamber is comprises a tubular shape. In one embodiment, the length of the tubular chamber is greater than a diameter of the spherical ball. In one embodiment, the length of the tubular chamber is less than twice a diameter of the spherical ball. In one embodiment, the spherical ball rotates as it is pulled toward the magnetically susceptible element and as it is pulled toward the second permanent magnet. In one embodiment, the second permanent magnet moves orthogonally (up and down as shown) or rotationally (e.g., where the poles are inverted or "flipped" to push the ball away) relative to the first permanent magnet. As mentioned above, the second magnet can be set alongside the chamber of the ball magnet going in a parallel direction, rather slide past the other end of chamber only. For example, the chamber may be turned 90 degrees, so the electromagnet and chamber will slide parallel to the supporting magnet. In some cases parallel movement may be an effective way to cause ball magnet to vibrate and induce current and voltage in the coil, for example.

In one embodiment, a spacer between the first permanent magnet and the core at the proximate end is configured to weaken the second magnetic force so that the first magnetic force moves the first permanent magnet away from the proximate end when the second permanent magnet is within a first range. The spacer may set the second magnetic force below a threshold such that it can be overcome by the first magnetic force when the second magnet is in a predetermined position or within a predetermined first range, for example.

Example Application

Figure 2:
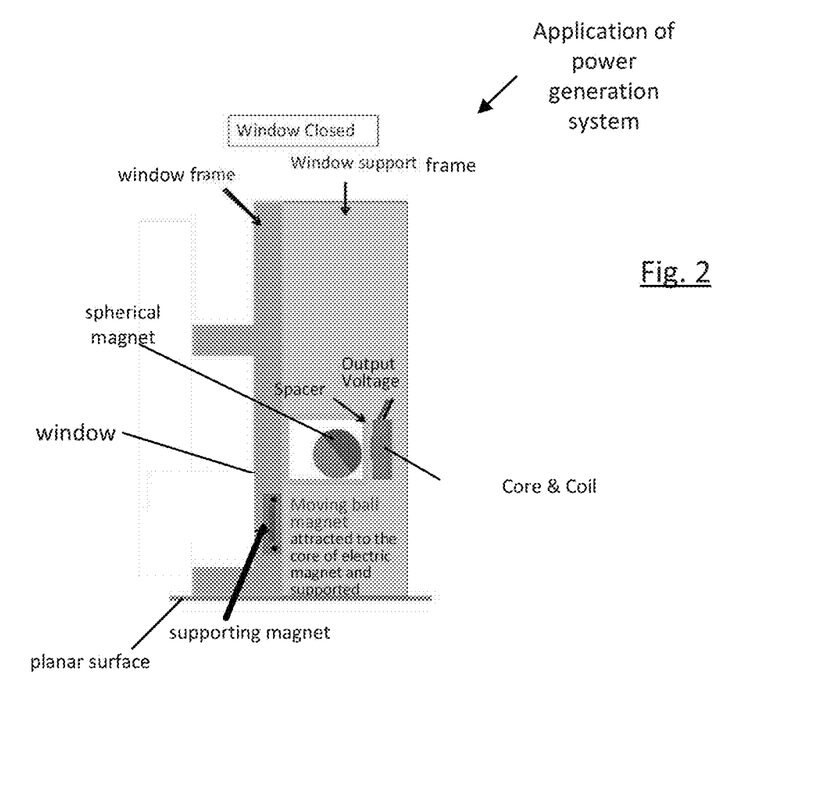
FIG. 2 illustrates an apparatus according to one embodiment of the present disclosure.

FIGS. 2-6 show an exemplary application of a power generation system embodiment. In FIG. 2, the application of the power generation system is a window where the power generation system can be used to power electronic circuitry including a sensor for detecting certain conditions (e.g., temperature) and communications circuits for sending and receiving information wirelessly (e.g., Bluetooth). FIG. 2 shows a support frame and a window frame. The support frame is permanently fixed and is positioned on top of a planar surface (e.g., forming a window sill). The window support frame may be used to attach the power generation system, sensor, and related electronics, for example. FIGS. 2-6 show a spherical magnet inside a chamber (e.g., a tubular chamber or housing) having a proximate end near a core and coil and a distal end the window frame (other electronic circuitry not shown). The window frame and window are moveable up and down relative to the support frame as the window is opened and closed. The supporting magnet may be permanently attached to the window frame. As the window frame moves up and down so does the supporting magnet. Thus, the supporting magnet moves across the distal end of the chamber orthogonal to the direction of movement of the spherical magnet inside the chamber, for example. In this example, a spacer is shown located between the spherical magnetic ball and the inductive core, which dampens the attraction force acting between the spherical magnetic ball and the core as described above.

FIGS. 2-6 show various positions of the support magnet as it travels up and down. The direction of movement of the support magnet is shown by a wide up/down arrow in each figure. Initially, as shown in FIG. 2, the window frame is in a closed position. In this initial position, the supporting magnet is located below the tubular chamber. In this configuration, the spherical magnetic ball is at a resting position and held in place magnetic attraction between the magnetic ball and the core. Accordingly, when the window is closed, the magnetic force of attraction between the spherical magnetic ball and the core is stronger than the magnetic force of attraction between the spherical magnetic ball and the supporting magnet (out of range in this position) causing the spherical magnetic ball to be at the proximal end and farthest away from the supporting magnet.

Figure 3:
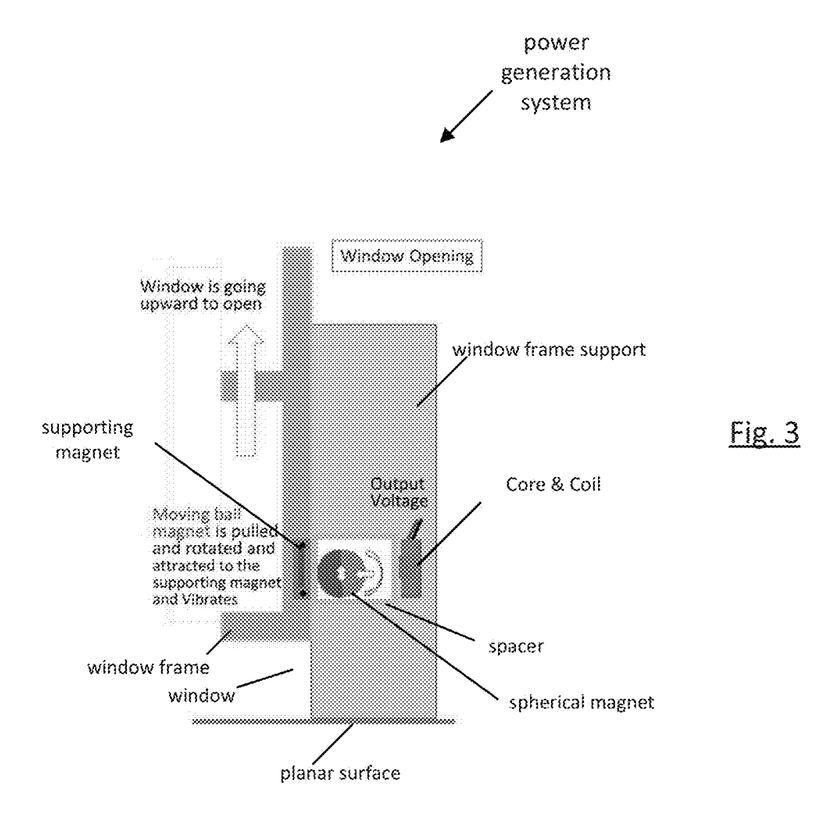
FIG. 3 illustrates an apparatus according to one embodiment of the present disclosure.

As the window frame starts to move up, shown in FIG. 3, the window starts to open—"opening" position—and the supporting magnet moves up. In response, the magnetic force between the spherical magnetic ball and the supporting magnet starts to increase. At some point, when the supporting magnet moves close enough to the spherical magnetic ball to cause the magnetic force between the spherical magnetic ball and the supporting magnet to be larger than the magnetic force between the core and the spherical magnetic ball, the spherical magnetic ball is pulled toward the supporting magnet and away from the core. This movement changes the magnetic field in the core, which may produce a current. Additionally, vibrations caused by the ball colliding against the distal end may further cause changes in the magnetic field, and may produce current, for example.

Figure 4:
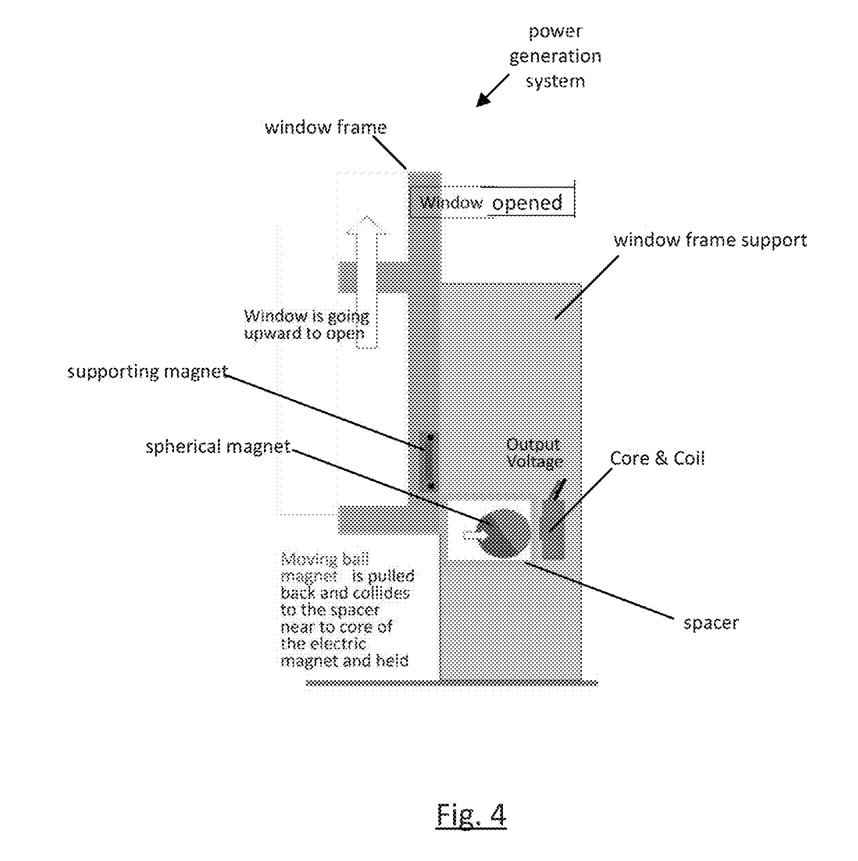
FIG. 4 illustrates an apparatus according to one embodiment of the present disclosure.

Next, as shown in FIG. 4, the window frame continues to move up to a position above the distal end of the tubular chamber, distancing the supporting magnet from the spherical magnetic ball. The attraction force between the two permanent magnets (the spherical magnetic ball and the supporting magnet) becomes weaker than the magnetic force between the spherical magnetic ball and the core, which causes the spherical magnetic ball to be pulled toward to the core. The spherical magnetic ball is held in place, now at the proximate end, by its' own magnetic field attraction to the core. The spherical magnetic ball vibrates when it collides with the spacer and comes to a stop. The movement toward the proximate end and the vibrations of the ball and the core cause yet more variations in the core's magnetic field, and may produce current in the coil, for example.

Figure 5:
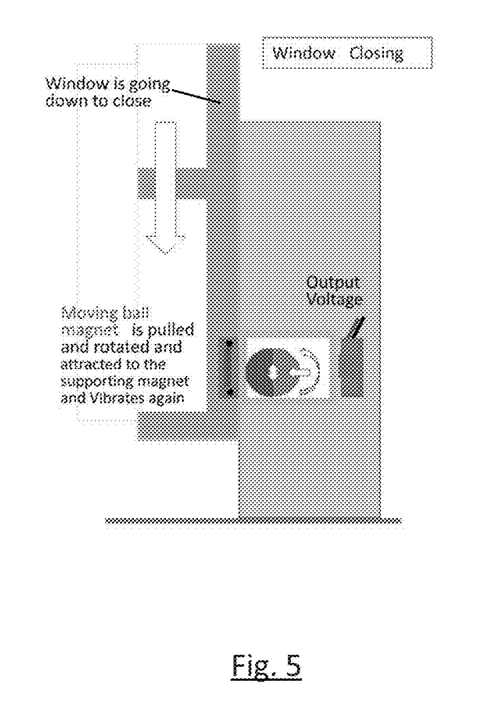
FIG. 5 illustrates an apparatus according to one embodiment of the present disclosure.

Next, as shown in FIG. 5, when the window frame starts to move down toward the tubular chamber, the window starts to close, and the supporting magnet approaches the spherical magnetic ball once again. The magnetic force between the supporting magnet and the spherical magnetic ball increases until it exceeds the magnetic force between the core and the spherical magnetic ball and pulls the ball back to the distal end of the chamber.

Figure 6:
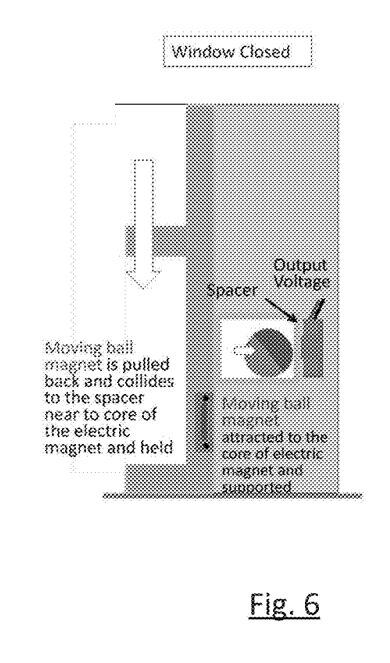
FIG. 6 illustrates an apparatus according to one embodiment of the present disclosure.

As shown in FIG. 6, at some point, the magnetic force between the supporting magnet and the spherical magnetic ball becomes less than the magnetic force between the spherical magnetic ball and the magnetic core of the temporary magnet. When the window is closed again, the spherical magnetic ball moves toward that core and collides with the spacer at the proximal end.

Physical movement and vibrations of the spherical magnetic ball from the spherical magnetic ball pulled in one direction and the other causes oscillations in the magnetic field of the core. These physical movements cause changes in the magnetic field of the core, which result in current and voltage oscillations in the coil. As described above, the current in the coil may be passed through a diode bridge rectifier and used to drive the power supply input of an electronic circuit, for example. A variety of other techniques may be employed to store and/or use the energy captured in the coil from the physical movement of the magnet.

Figures 7A, 7B:
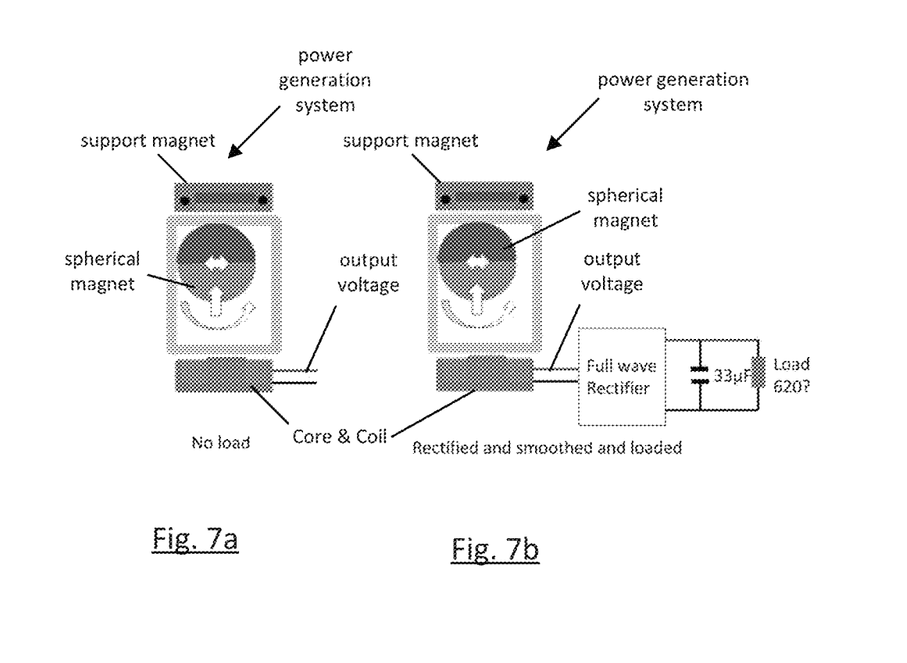
FIG. 7A illustrates an apparatus according to one embodiment of the present disclosure.
FIG. 7B illustrates an apparatus according to one embodiment of the present disclosure.

FIG. 7a shows a configuration of the power generation system with no load, the output voltage at the coil is measured directly, with no load. In FIG. 7a, the spherical magnetic ball is 5 mmϕ with a magnet intensity of 450 milli Tesla (mT)/4500 Grams (G) and the supporting magnet is 5 mmϕ disk with a thickness of 3 milli meter (mm). The core and coil comprise a 24 Volts (V) driving electric magnet with an 18 mmϕ disk, a 10 mm thickness. It has an internal electric resistance of 418Ω and an inductance of 0.191 H.

FIG. 7b shows a configuration of the power generation system with a load (e.g., a 620 ohm resistor coupled to the coil via a bridge rectifier and in parallel with a 33 uF capacitor). In this example, the output voltage at the coil is measured at the load. In FIG. 7b, the spherical magnetic ball is 10 mmϕ with a magnet intensity of 580 mT/5800 and the supporting magnet is 8 mmϕ disk with an 8 millimeter (mm) thickness and a magnet intensity of 420 mT/4200 G. The core and coil are the same as that of FIG. 7a. In FIG. 7b, a full-wave-rectifier rectifies and smooths the oscillations of the output voltage using a full-wave rectifier and a resistor-capacitor (RC) circuit. The capacitor of the RC circuit has a capacitance of 33 micro Farads (µF) and the resistor of the RC circuit has a resistance of 620Ω (load resistance), in the configuration shown in FIGS. 7a-b.

Figure 8:
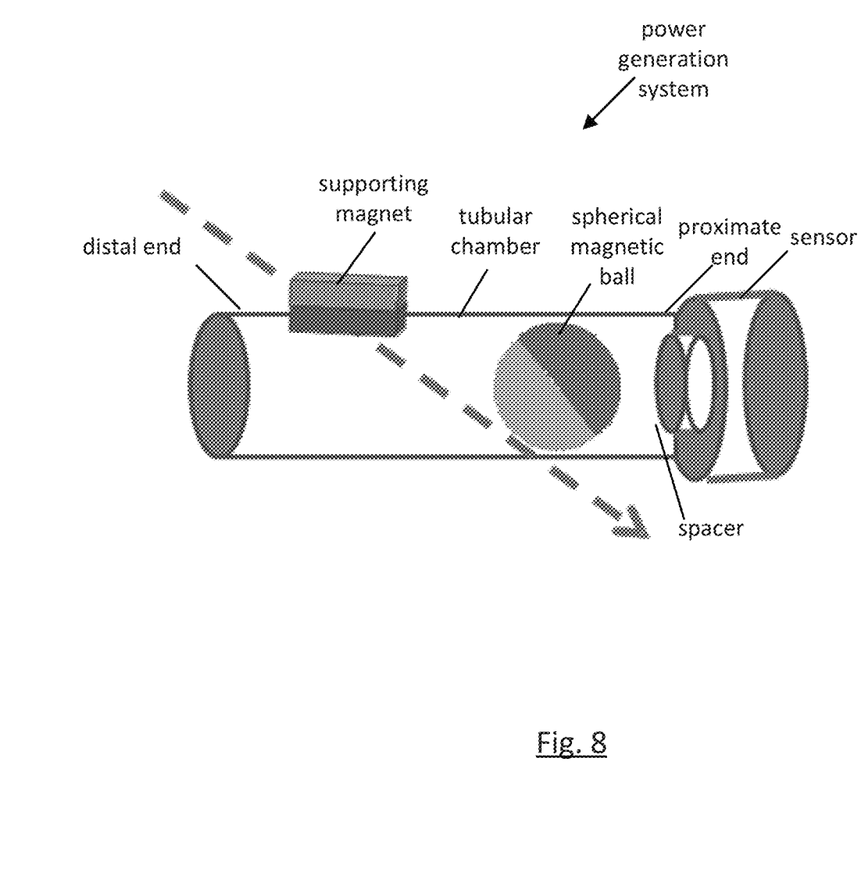
FIG. 8 illustrates an apparatus according to one embodiment of the present disclosure.

FIG. 8 shows another exemplary embodiment of the power generation system. The supporting magnet is affixed to the outer surface of the tubular chamber toward a distal end. It rotates around the outer surface and otherwise functions like the supporting magnet described with reference to FIGS. 1-6. A sensor is shown, at the proximate end, which may use the power generation system as its power source. In one embodiment of the disclosure, the output voltage of the power generation system is up to 2 Volts (V).

Figure 9A:
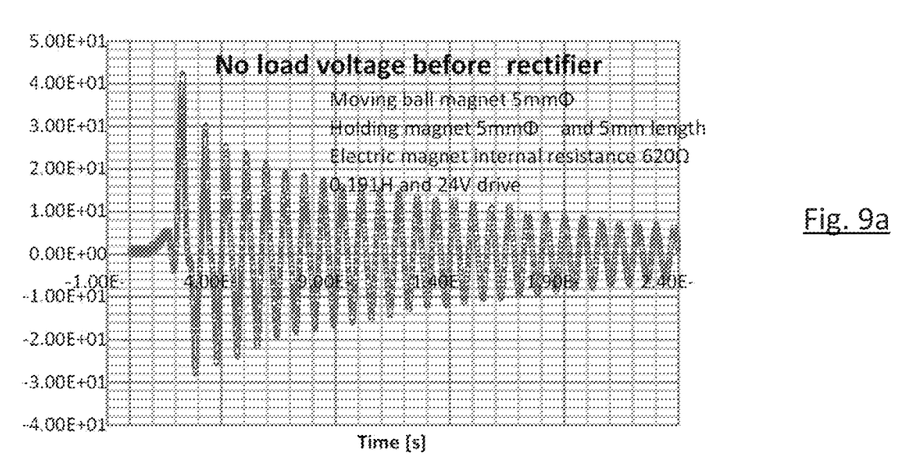
FIG. 9A illustrates a waveform according to one embodiment of the present disclosure.
Figure 9B:
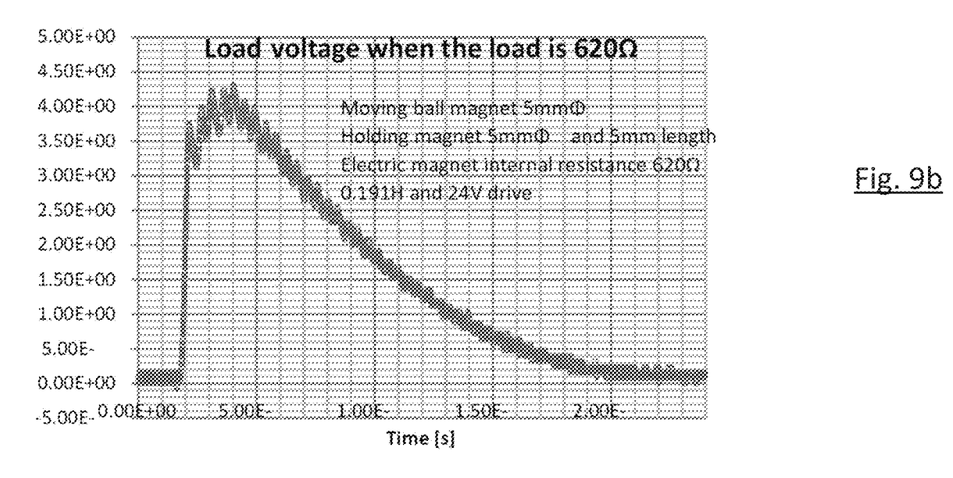
FIG. 9B illustrates a waveform according to one embodiment of the present disclosure.

FIGS. 9a and 9b each show a graph of the output voltage, generated by the coil versus time. In each graph, the y-axis represents output voltage and the x-axis represents time. The graph in FIG. 9a shows the output voltage with oscillations and the graph in FIG. 9b shows the output voltage after rectification, smoothing, and loading. FIG. 9a shows a graph of the behavior of the power generation system where there is no load at its output voltage and FIG. 9b shows a graph with a load at the output voltage. In FIG. 9a, the output voltage oscillates at the frequency of 92.8 Hertz (Hz), the peak maximum voltage is 4.24V and the maximum peak-to-peak voltage is 7.04V.

As mentioned above, the output voltage is smoothed and loaded. The voltage increases to a maximum value and then decreases, but the output voltage is higher than 1.7V for a sustained period, which is the minimum voltage required to power an ultra-low power MT Low Energy Bluetooth (BLE) device. For example, the time interval is 84 msec which is 8.4 times longer than 10 msec that is required to connect the BLEs.

Figure 10A:
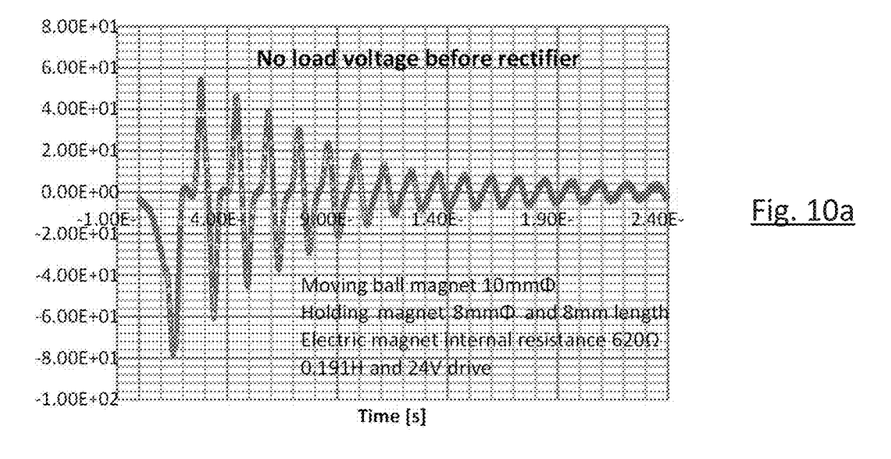
FIG. 10A illustrates a waveform according to one embodiment of the present disclosure.
Figure 10B:
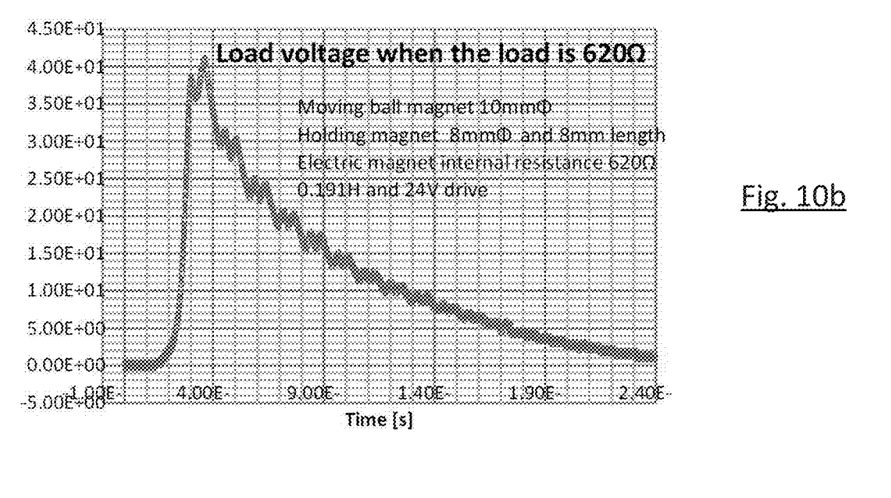
FIG. 10B illustrates a waveform according to one embodiment of the present disclosure.

FIGS. 10a and 10b show graphs like those of FIGS. 9a and 9b except that the design parameters are different as described above. FIG. 10a shows a graph of the output voltage vs. time, without the use of a rectifier, and FIG. 10b shows a graph of the output voltage vs. time after a rectifier and load.

When not loaded, the output voltage oscillates with the frequency of 37.3 Hz, for example, because the mass of the spherical magnetic ball is 8 times heavier than that of the support magnet. Generally, the larger the magnet (magnet intensity is higher), the higher the output voltage. The maximum peak voltage is −8.0V and the maximum peak-to-peak voltage is 13.3V. When rectified, smoothed and loaded, as shown in FIG. 10b, the output voltage reaches 4.12V, and the time interval when the voltage is higher than 1.7V is 200 msec which is 20 times longer than 10 msec. The load resistance is nearly the same as in FIG. 9a.

With the use of a rectifier, shown in FIG. 10b, the output voltage oscillates less and is smoother than it is without the use of a rectifier, shown in FIG. 10a.

Further Example Embodiments

The following example embodiments may be arranged in various combinations.

In one embodiment, the present disclosure includes an apparatus comprising: a batteryless electronic circuit; a chamber; a first permanent magnet configured in the chamber; a second permanent magnet external to the chamber and moveable relative to the first permanent magnet at a distal end of the chamber, the first and second permanent magnets configured to generate a first magnetic force that changes in response to the movement of the second permanent magnet relative to the first permanent magnet; a magnetically susceptible element external to the chamber and located at the proximate end of the chamber, the magnetically susceptible element and the first permanent magnet configured to generate a second magnetic force that changes in response to the movement of the first permanent magnet relative to the magnetically susceptible element; and an inductive coil magnetically coupled to the magnetically susceptible element, the inductive element having an output coupled a power input of the electronic circuit, wherein when the first magnetic force is greater than the second magnetic force, the first permanent magnet is pulled toward the second permanent magnet and away from the magnetically susceptible element, wherein when the second magnetic force is greater than the first magnetic force, the first permanent magnet is pulled toward the magnetically susceptible element, and wherein movement of the first permanent magnet causes a change in a magnetic flux of the magnetically susceptible element, and in accordance therewith, produces a voltage at the output of the inductive coil to power the electronic device.

In another embodiment, the present disclosure includes an apparatus, method, or system wherein the second permanent magnet moves relative to the first permanent magnet such that the first and second magnetic forces alternatively control the movement of the first permanent magnet.

In another embodiment, the present disclosure includes an apparatus, method, or system wherein: when the second permanent magnet is in a first range from the first permanent magnet, the first magnetic force exceeds the second magnetic force and the first permanent magnet is pulled toward the second permanent magnet at the distal end and away from the proximate end, and when the second permanent magnet in a second range from the first permanent magnet greater than the first range, the second magnetic force exceeds the first magnetic force and the first permanent magnet is pulled toward the magnetically susceptible element at the proximate end and away from the distal end.

In another embodiment, the present disclosure includes an apparatus, method, or system wherein the first permanent magnet is a spherical ball and the chamber is comprises a tubular shape.

In another embodiment, the present disclosure includes an apparatus, method, or system wherein the length of the tubular chamber is greater than a diameter of the spherical ball.

In another embodiment, the present disclosure includes an apparatus, method, or system wherein the length of the tubular chamber is less than twice a diameter of the spherical ball.

In another embodiment, the present disclosure includes an apparatus, method, or system wherein the spherical ball rotates as it is pulled toward the magnetically susceptible element and as it is pulled toward the second permanent magnet.

In another embodiment, the present disclosure includes an apparatus, method, or system wherein the first permanent magnet collides when it reaches a distal end or proximate end and creates vibrations upon colliding that change the magnetic flux.

In another embodiment, the present disclosure includes an apparatus, method, or system wherein movement of the first permanent magnet when pulled to either the magnetically susceptible element or the second permanent magnet changes the magnetic flux.

In another embodiment, the present disclosure includes an apparatus, method, or system wherein the second permanent magnet moves orthogonally or rotationally relative to the first permanent magnet.

In another embodiment, the present disclosure includes an apparatus, method, or system wherein a spacer between the first permanent magnet and the magnetically susceptible element at the proximate end is configured to weaken the second magnetic force so that the first magnetic force moves the first permanent magnet away from the proximate end when the second permanent magnet is within a first range.

In another embodiment, the present disclosure includes an apparatus, method, or system wherein the magnetically susceptible element includes a core surrounded by the inductor, wherein current flows through the inductive coil due to vibrations of the first permanent magnet.

In another embodiment, the present disclosure includes an apparatus, method, or system wherein the inductive coil is wrapped around the core N number of turns, N being an integer value.

In another embodiment, the present disclosure includes an apparatus, method, or system wherein the number of turns of the inductive coil is determinative of a current generated in the inductive coil based on magnetic flux in the core.

In another embodiment, the present disclosure includes an apparatus, method, or system apparatus comprising: an electronic device; a first magnet; and an inductive coil surrounding a magnetically susceptible core, wherein movement of the first magnet relative to the magnetically susceptible core changes a magnetic flux in the magnetically susceptible core to produce a current in the inductive coil, and in accordance therewith, provide power to the electronic device.

In another embodiment, the present disclosure includes an apparatus, method, or system wherein the first magnet resides in a chamber, and wherein the first magnet collides with one or more of a distal end, proximate end, or sidewall of the chamber to produce vibrations that move the first magnet relative to the magnetically susceptible core.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An apparatus comprising:
a batteryless electronic circuit;
a chamber;
a first permanent magnet configured in the chamber;
a second permanent magnet external to the chamber and moveable relative to the first permanent magnet at a distal end of the chamber, the first and second permanent magnets configured to generate a first magnetic force that changes in response to the movement of the second permanent magnet relative to the first permanent magnet;
a magnetically susceptible element external to the chamber and located at the proximate end of the chamber, the magnetically susceptible element and the first permanent magnet configured to generate a second magnetic force that changes in response to the movement of the first permanent magnet relative to the magnetically susceptible element; and
an inductive coil magnetically coupled to the magnetically susceptible element, the inductive element having an output coupled to a power input of the electronic circuit,
wherein when the first magnetic force is greater than the second magnetic force, the first permanent magnet is pulled toward the second permanent magnet and away from the magnetically susceptible element,
wherein when the second magnetic force is greater than the first magnetic force, the first permanent magnet is pulled toward the magnetically susceptible element, and
wherein movement of the first permanent magnet causes a change in a magnetic flux of the magnetically susceptible element, and in accordance therewith, produces a voltage at the output of the inductive coil to power the electronic circuit.

2. The apparatus of claim 1 wherein the second permanent magnet moves relative to the first permanent magnet such that the first and second magnetic forces alternatively control the movement of the first permanent magnet.

3. The apparatus of claim 1 wherein:
when the second permanent magnet is in a first range from the first permanent magnet, the first magnetic force exceeds the second magnetic force and the first permanent magnet is pulled toward the second permanent magnet at the distal end and away from the proximate end, and
when the second permanent magnet in a second range from the first permanent magnet greater than the first range, the second magnetic force exceeds the first magnetic force and the first permanent magnet is pulled toward the magnetically susceptible element at the proximate end and away from the distal end.

4. The apparatus of claim 1 wherein the first permanent magnet is a spherical ball and the chamber comprises a tubular shape.

5. The apparatus of claim 1 wherein the length of the tubular chamber is greater than a diameter of the spherical ball.

6. The apparatus of claim 1 wherein the length of the tubular chamber is less than twice a diameter of the spherical ball.

7. The apparatus of claim 1 wherein the spherical ball rotates as it is pulled toward the magnetically susceptible element and as it is pulled toward the second permanent magnet.

8. The apparatus of claim 1 wherein the first permanent magnet collides when it reaches a distal end or proximate end and creates vibrations upon colliding that change the magnetic flux.

9. The apparatus of claim 1 wherein movement of the first permanent magnet when pulled to either the magnetically susceptible element or the second permanent magnet changes the magnetic flux.

10. The apparatus of claim 1 wherein the second permanent magnet moves orthogonally or rotationally relative to the first permanent magnet.

11. The apparatus of claim 1 wherein a spacer between the first permanent magnet and the magnetically susceptible element at the proximate end is configured to weaken the second magnetic force so that the first magnetic force moves the first permanent magnet away from the proximate end when the second permanent magnet is within a first range.

12. The apparatus of claim 1 wherein the magnetically susceptible element includes a core surrounded by the inductive coil, wherein current flows through the inductive coil due to vibrations of the first permanent magnet.

13. The apparatus of claim 1 wherein the inductive coil is wrapped around the core N number of turns, N being an integer value.

14. The apparatus of claim 1 wherein the number of turns of the inductive coil is determinative of a current generated in the inductive coil based on magnetic flux in the core.

* * * * *